United States Patent
Offer (10) Patent No.: US 8,100,213 B2
(45) Date of Patent: Jan. 24, 2012

(54) PARKING DEVICE FOR MOTOR VEHICLES

(76) Inventor: Danilo Offer, Cologno Monzese (IT)

( * ) Notice: Subject to any disclaimer, the term of this patent is extended or adjusted under 35 U.S.C. 154(b) by 974 days.

(21) Appl. No.: 11/788,012

(22) Filed: Apr. 18, 2007

(65) Prior Publication Data

US 2007/0246284 A1    Oct. 25, 2007

(30) Foreign Application Priority Data

Apr. 21, 2006  (IT) ............... MI2006A0788

(51) Int. Cl.
*B60S 9/21*  (2006.01)
*B60S 9/205* (2006.01)

(52) U.S. Cl. .......... 180/199; 180/15; 180/200; 180/202; 180/209

(58) Field of Classification Search .......... 180/11, 180/15, 199, 200, 202, 209
See application file for complete search history.

(56) References Cited

U.S. PATENT DOCUMENTS

| | | | | |
|---|---|---|---|---|
| 2,002,724 A | * | 5/1935 | Walker | 180/199 |
| 2,638,995 A | * | 5/1953 | Gottlieb | 180/202 |
| 2,685,934 A | * | 8/1954 | Coloma | 180/200 |
| 2,808,271 A | * | 10/1957 | Devenne | 280/761 |
| 2,819,766 A | * | 1/1958 | Bisceglie | 180/200 |
| 3,095,936 A | | 7/1963 | Walker | |
| 3,196,969 A | * | 7/1965 | Senzani | 180/202 |
| 3,240,287 A | * | 3/1966 | Lepore et al. | 180/202 |
| 3,246,709 A | * | 4/1966 | Lossev | 180/200 |
| 3,266,587 A | * | 8/1966 | Roberts | 180/200 |
| 3,589,462 A | * | 6/1971 | Inagaki et al. | 180/202 |
| 4,211,299 A | * | 7/1980 | Schulte | 180/200 |
| 4,998,595 A | * | 3/1991 | Yeh | 180/202 |
| 5,884,720 A | * | 3/1999 | Ackerman | 180/199 |

FOREIGN PATENT DOCUMENTS

| | | |
|---|---|---|
| DE | 1108095 B | 5/1961 |
| DE | 3613495 A1 | 10/1987 |
| FR | 1282820 A | 1/1962 |
| WO | WO9719840 | 6/1997 |

* cited by examiner

*Primary Examiner* — Kevin Hurley
*Assistant Examiner* — Marc Scharich
(74) *Attorney, Agent, or Firm* — R. Ruschena Patent Agent, LLC (57) ABSTRACT

A parking device for motor vehicles to facilitate and expedite the parallel parking operation especially when the space available between two parked vehicles is not abundant. The device is typically operated after the car has entered the parking spot diagonally so that one of the front wheels is touching the sidewalk curb. The device is normally mounted on the bottom surface of a motor vehicle, preferably in the rear part of a motor vehicle. The device consists essentially of a powered wheel that is lowered to the ground and it is further pushed down to raise the rear part of a motor vehicle until the rear wheels are no longer in contact with the ground. The lowered wheel, perpendicular to the other wheels of the motor vehicle, is then powered to turn in either directions to cause the rear part of the motor vehicle to move toward the sidewalk until the motor vehicle is parallel to the sidewalk curb and mostly aligned with the other parked vehicles. The device is also facilitating and expediting the exiting from the parking space by executing the parking steps in a reverse order.

5 Claims, 8 Drawing Sheets

PARKING DEVICE FOR MOTOR VEHICLES

RELATED APPLICATIONS

This application is claiming foreign priority on the related Italian patent application number MI2006A000788 filed on Apr. 21, 2006.

BACKGROUND OF THE INVENTION

1. Field of the Invention

The present invention relates to a parking aid device for motor vehicles.

2. Background Art

It is a known fact that parking motor vehicles in confined spaces is often very difficult and time consuming. When the vehicle is large and/or the parking space is not abundant, numerous maneuvers are required to achieve proper parking. The number of maneuvers increases in the case of parallel parking along the sidewalk, when parking between two other parked vehicles. The time required to park can considerably increase when parking in narrow roads and where the traffic is intense. This situation leads to hurried parking maneuvers with possible damages to the parking motor vehicle as a result of collisions with the other vehicles already parked. In view of the state of the art, the object of the present invention is to provide a parking aid device for motor vehicles that makes parking easier and quicker.

SUMMARY OF THE INVENTION

According to the present invention, said object is achieved by a parking device for motor vehicles having a front and a rear part both of which with at least one wheel, said parking device comprising at least one wheel and movement means to move the wheel from a stowed position in which it is adjacent with the bottom of the motor vehicle, downwards to a operating position away from the bottom of the motor vehicle until the at least one wheel of the rear or front part of the motor vehicle lifts off the ground. In the operating position, the wheel of the parking device has a rotation axis substantially parallel to the bottom of the motor vehicle and said parking device comprising means for rotating the wheel of the parking device in either directions.

The parking device according to the invention finds its best application in case of parallel parking along the sidewalk between two vehicles already parked. In this case, it will be necessary to enter the parking area diagonally with the front part of the motor vehicle positioned so as one of the front wheel of the parking vehicle is touching the sidewalk's curb, at a short distance from the other already-parked motor vehicle. In this position, the gear and the parking brake will have to be disengaged and the parking device will be started by lowering the device's wheel until the rear wheel or wheels of the motor vehicle are raised from the ground and the device's wheel turns towards the sidewalk until the car is aligned with the other two vehicles already parked.

To allow maneuvering the motor vehicle easily out of the parking space, the reverse operation will be performed, meaning that the parking device' wheel will be rotated to move the rear part of the motor vehicle away from the sidewalk curb until the motor vehicle is in a position where it would be able to exit from the parking space using the reverse gear while clearing the vehicle parked behind. The parking device's wheel will be raised until the rear wheels of the motor vehicle are in contact with the ground.

BRIEF DESCRIPTION OF THE DRAWINGS

The details and the advantages of the present invention will appear clear from the following detailed description of its practical embodiments, illustrated by way of, but not limited to, examples on the attached drawings, on which.

DETAILED DESCRIPTION OF THE INVENTION OR OF THE PREFERRED EMBODIMENTS

Preferred embodiments of the present invention will be described hereinafter with reference to the accompanying drawings. With reference to FIGS. 1-5, a parking device 100 for motor vehicles is shown according to the present invention. Said device is normally fitted underneath a motor vehicle and particularly underneath the rear part of the motor vehicle, as indicated by FIG. 4 which schematically shows a motor vehicle 200 equipped with the parking device 100 attached to the bottom 202 of the motor vehicle near the rear wheels 201.

The device comprises a frame 1 which includes the side guides 2 that allow the frame 1 to slide from its stowed position and be lowered toward the ground. The guides 2 of the frame 1 are sliding over the metal bars 3 which are hinged by the axles 4 to the supports 5 which are attached to the bottom of the motor vehicle.

Inside frame 1 are mounted the wheel 6, attached by way of the axle 6a and protruding from the frame 1. The wheel 6 is coupled to a motor 7 for turning the wheel 6 in both directions. The motor can consist, for example, of an electric motor or a hydraulic or a pneumatic motor.

The frame 1 and the attached powered wheel 6 is rotated and pushed toward the ground by the action of at least two pistons of hydraulic, pneumatic or electro-magnetic type, which are attached to the bottom of the motor vehicle by way of supports 10 and related pivoting axles 11. The pistons 9 are attached to the frame 1 by way of the hinged support 8.

Figure 1:
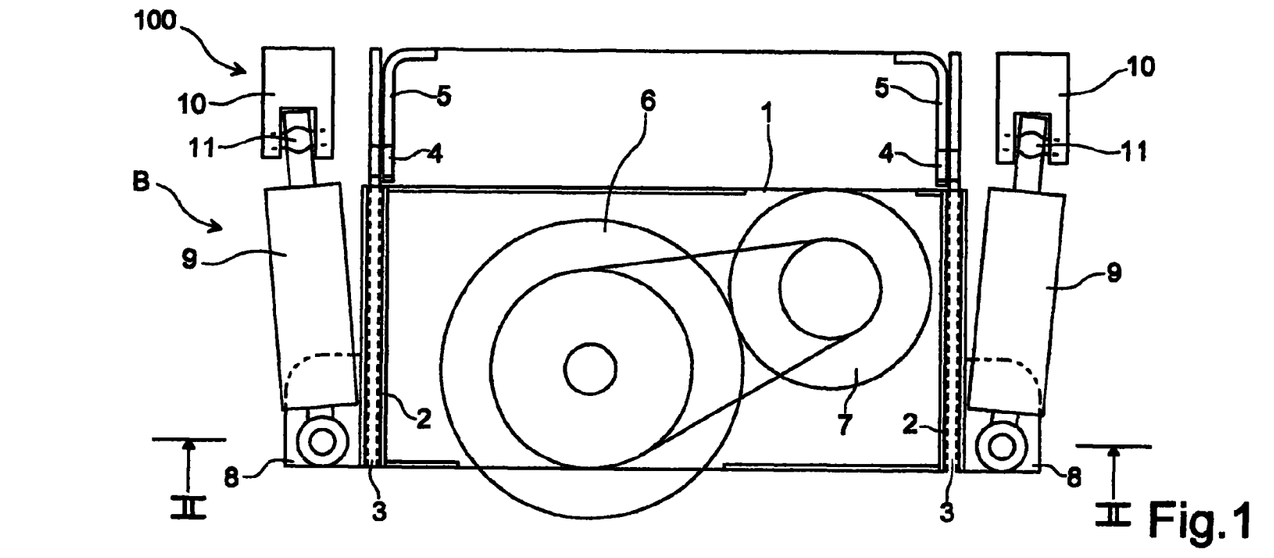
FIG. 1 is a front view of the parking device fitted to a motor vehicle in accordance with the present invention.
Figure 2:
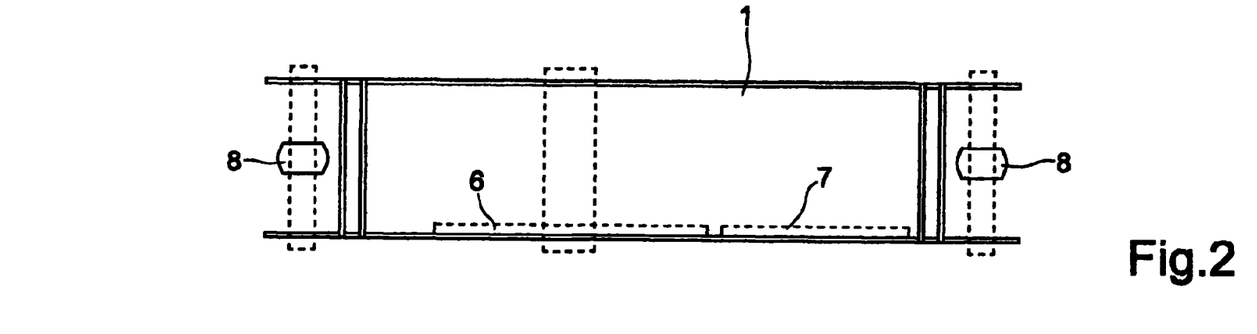
FIG. 2 is a schematic sectional view of the parking device in FIG. 1 in accordance with the line II-II.
Figure 3:
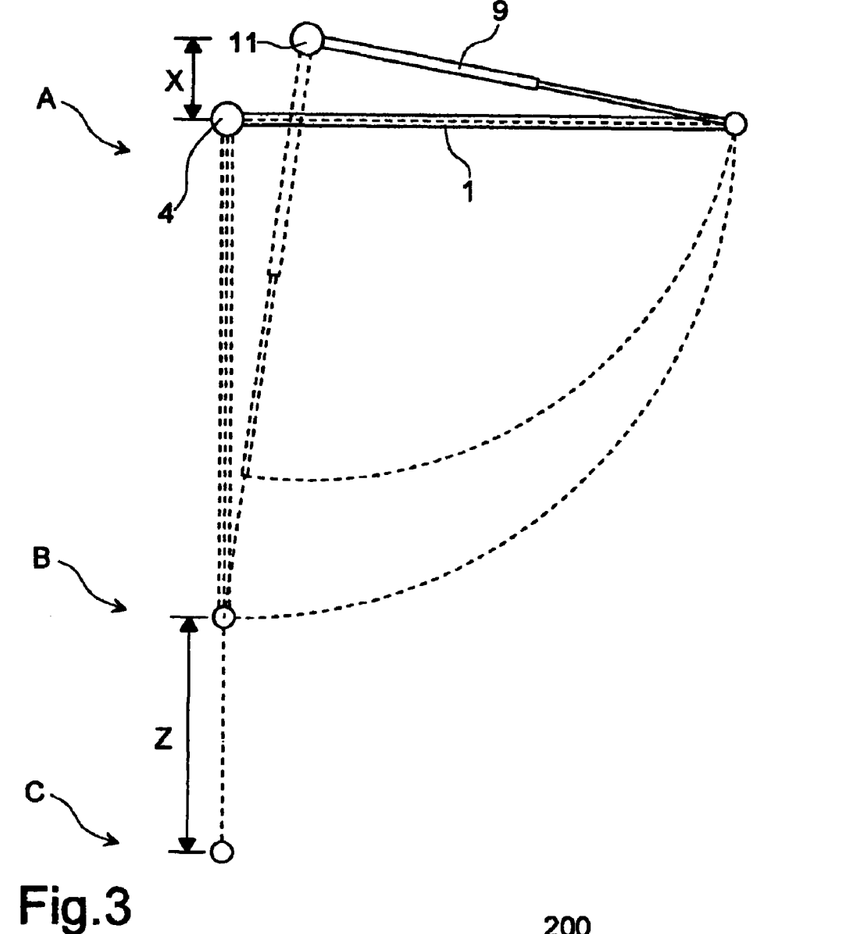
FIG. 3 is a schematic side view of the parking device that switches from a stowaway position to a work position.
Figure 4:
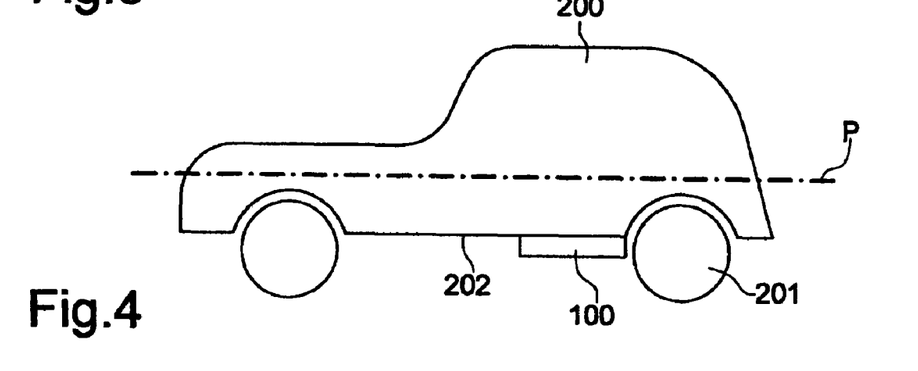
FIG. 4 shows a motor vehicle to which the parking device of FIG. 1 has been fitted.

According to the schematic of FIG. 3, when in the stowaway position A, the parking device is laying flat, parallel to the bottom surface of the motor vehicle.

When the motor vehicle reaches a parking area, the user inside the vehicle operates a control to start the operation of the parking device using, for example, using an electric control which starts the movement of piston 9 that causes a rotation and the movement downward of the frame 1 which includes the powered wheel 6.

This causes the parking device to move to a working position B according to FIG. 3 by rotating the frame 1 around the axle 4 so that the axle of the powered wheel 6 inside frame 1 is parallel to the ground. At the same time, the piston 9 rotates around the axles 11 of the supports 10.

After the motor vehicle rear part has been lifted, a second timed manual control operates the motor 7 to turn the wheel 6 to either directions causing a movement to the rear side of the motor vehicle, toward the sidewalk's curb, until the motor vehicle is parallel to the curb and aligned with the other vehicles parked.

Once the motor vehicle has been parked, the above-mentioned controls are operated in reverse sequence causing the powered wheel 6 inside frame 1 to be lifted, causing the rear wheels of the motor vehicle to touch the ground and the frame 1 is repositioned in the stowaway position underneath the motor vehicle by the action of the pistons 9.

The axles 4 of the frame 1 are preferably arranged lower, by a distance X, with respect to the hinge axles 11 securing the pistons 9 to the supports 10. Preferably, the same distance X exists between the same points with respect to the longitudinal axis P of the motor vehicle to which the device is fitted. The two distances X ensure a sufficient torque required by the pistons 9 to move the frame 1 from the stowaway position A to the work position B, as indicated on FIG. 3.

Figure 5:
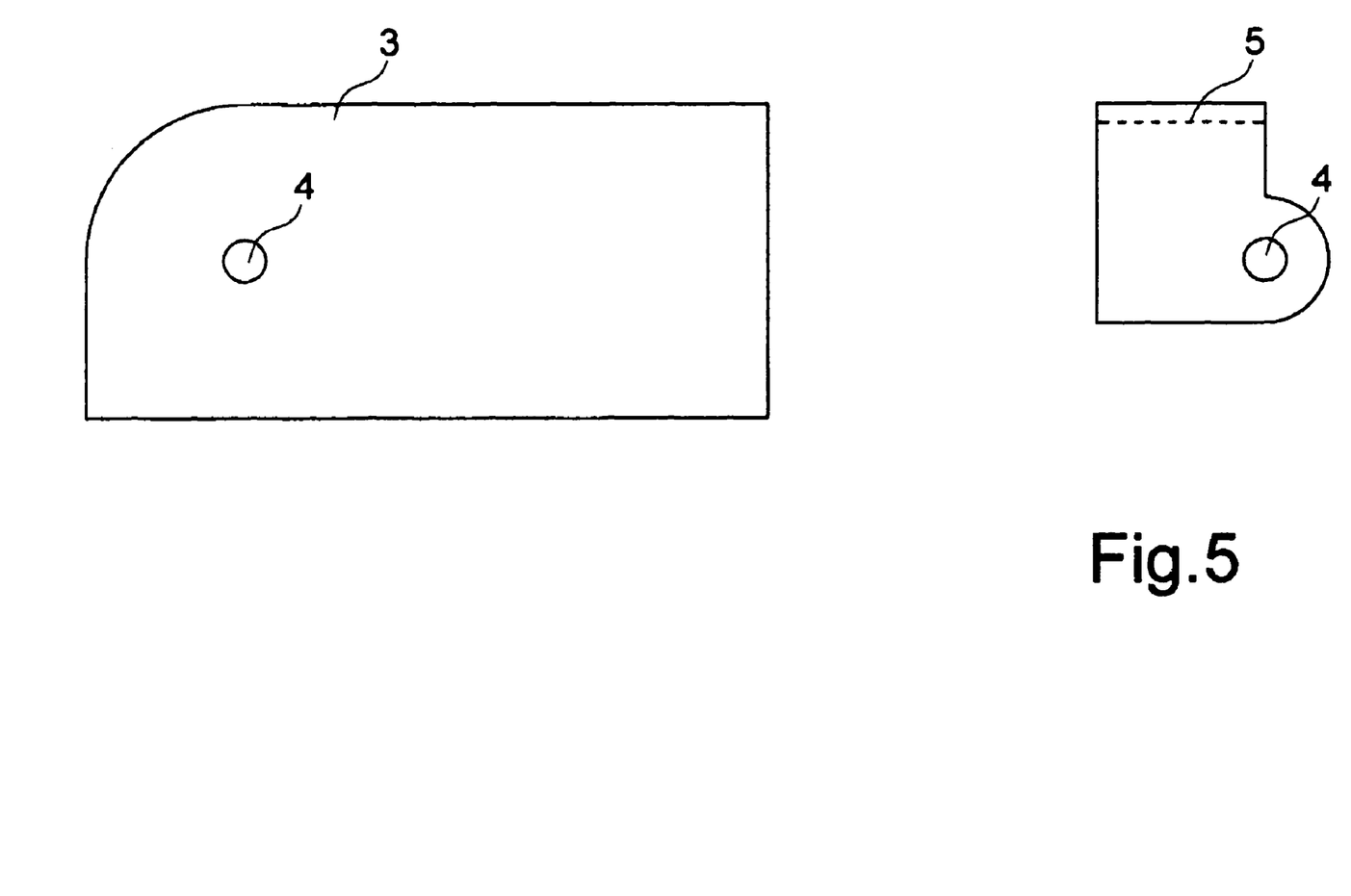
FIG. 5 shows details of the parking device of FIG. 1.

FIG. 5 shows in greater detail the sliding bars 3 and the fixed supports 5.

The sliding bars have a curved side for rotation around the axles 4 with the supports 5.

Figures 6, 7:
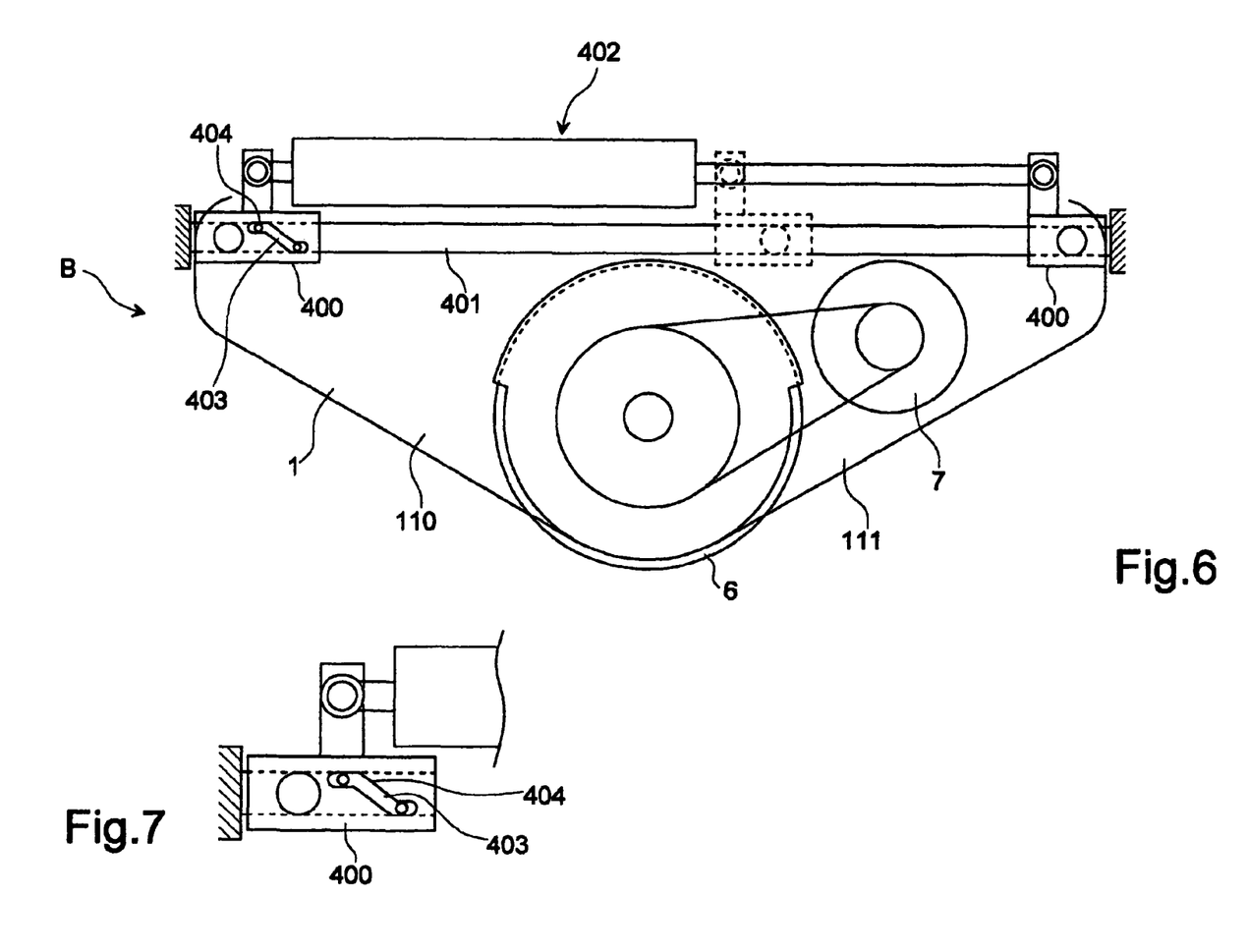
FIG. 6 is a front view of a parking device according to a second embodiment of the invention.
FIG. 7 shows a detail of the device of FIG. 6.

FIG. 6 shows the parking device according to a second embodiment of the invention. The parts identical to those of the device in FIG. 1 will be indicated by the same reference numbers. The parking device according to the second embodiment of the invention, comprises a frame 1 made up of two supporting sides 110 and 111 hinged on the axle of the powered wheel 6 and connected to two bushes 400 sliding on an axle 401. The bushes 400, attached to the supporting sides 110 and 111 are connected to a hydraulic, pneumatic or electromechanical piston 402 which moves them, the one with respect to the other, on the axle 401. The rotation from the stowaway position A, according to the diagram of FIG. 3 (shown by an unbroken line on FIG. 6), in which the frame 1 is substantially parallel to the bottom of the motor vehicle, to the work position B according to the diagram of FIG. 3 (broken line on FIG. 6), in which the frame 1 is substantially perpendicular to the bottom of the motor vehicle, is accomplished by the pin 403, attached to the axle 401, that slides inside the cavity 404 of bush 400. The shape of the cavity 404 and the sliding of the cavity 404 on the pin 403 are better shown in FIG. 7. When the bush 400 is moved longitudinally by the piston 402, the pin slides inside the curved cavity 404 of bushes 400 causing the scissor-like rotation of both supporting sides 110 and 111 and the orientation of the powered wheel 6 with its axle parallel to the ground. The frame 1 is thus rotated from its stowaway position A to the work position B. A further action of the piston 402 permits, by means of a scissors-like movement of the supporting sides 110 and 111, causes the movement of the wheel 6 downwards to lift the rear or front part of the motor vehicle by a distance sufficient to raise the rear wheels from the ground, obtaining the position C.

In case of availability on the bottom part of the motor vehicle of a compartment spacious enough to contain the parking device on FIG. 6, the mechanism based on the cavity 404 sliding on the pin 403 is no longer necessary to produce the rotation of the frame 1 and attached powered wheel 6.

Figure 8:
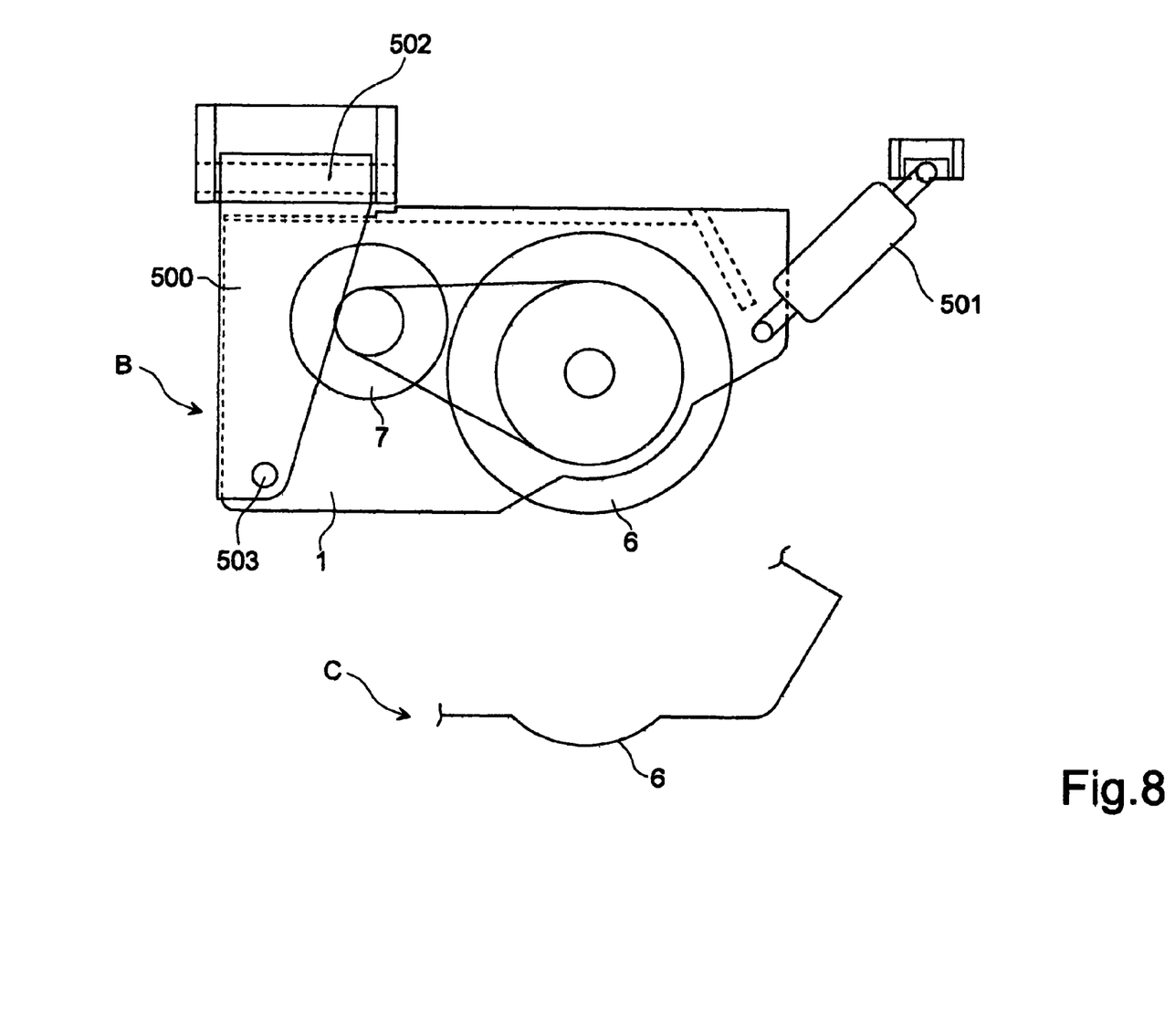
FIG. 8 is a front view of a parking device according to a third embodiment of the invention.

FIG. 8 shows a parking device according to a third embodiment of the invention. The parts identical to those of the device as described by the preferred embodiment of FIG. 1, will be shown with the same reference numbers. Unlike the parking device as described by the preferred embodiment of FIG. 1, the parking device illustrated on FIG. 8, has the frame pivoting around the axle 503 on a body frame 500 able to pivot at a right angle with respect to an axle 502 to be parallel to the bottom surface of the motor vehicle. By consequences, frame 1 can be pivoted by means of the rotation of the frame 500 on the axle 502, from a stowaway position A of FIG. 3 in which the frame itself is substantially parallel to the bottom surface of the motor vehicle to a work position B in which the frame 1 is substantially perpendicular to the bottom surface of the motor vehicle. The pneumatic, hydraulic or electromechanical pistons 501 produces both the rotation of the frame 1 from the stowaway position A to the operating position B and the downward movement of the wheel 6, by causing the frame 1 to pivot around the axle 503 of the body. This action produces the lifting of the rear or front part of the motor vehicle by a sufficient distance so that the rear wheels are raised from the ground, obtaining the position C.

Figure 9:
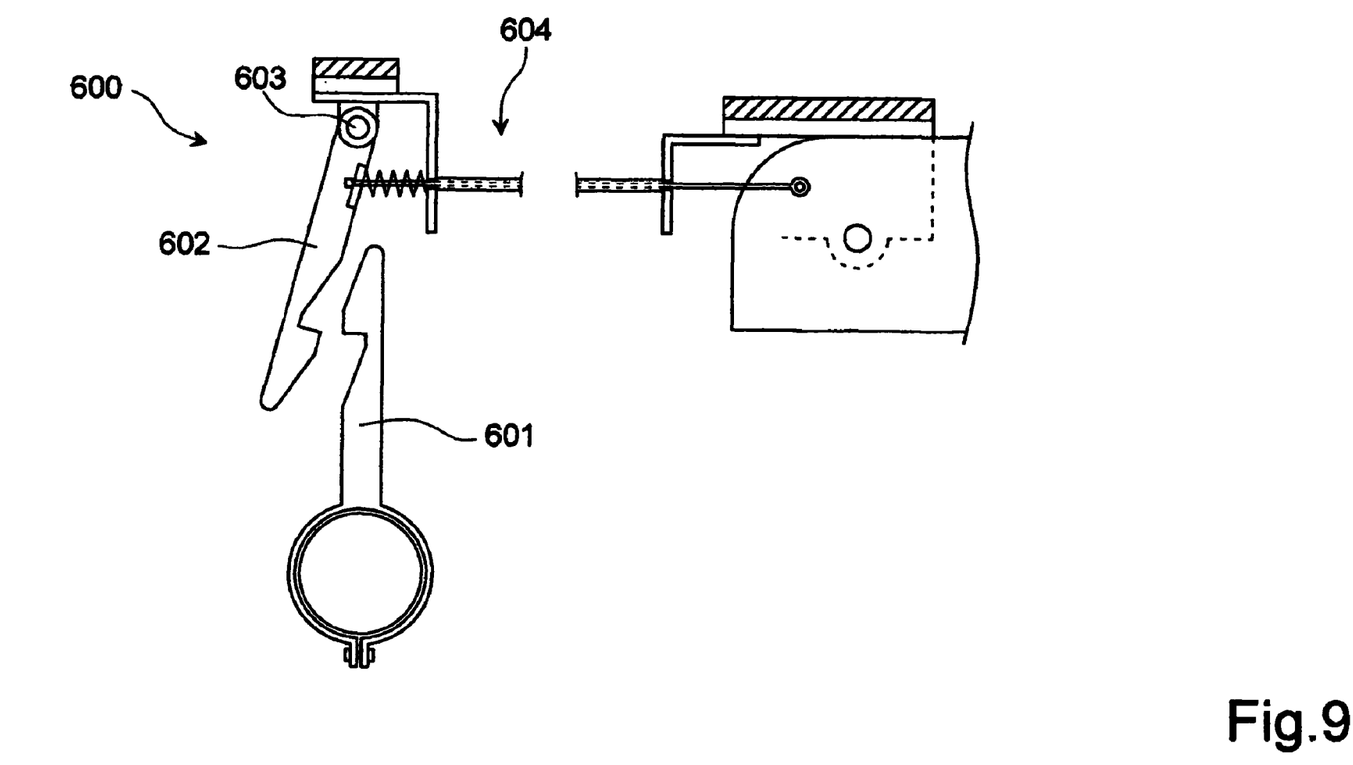
FIG. 9 shows a hooking device related to the parking device according to a variation of the invention embodiments.

FIG. 9 shows the hooking device 600 related to the parking device according to the embodiments of the present invention. The hooking device is designed to lock automatically the wheels of the parking vehicle during the operation of the parking device. The hooking device 600 comprises a first hook 601 connected to the axle shaft of the rear or front wheels of the motor vehicle and a second hook 602 connected to the bottom of the motor vehicle, able to pivot around the axle. 603. The hooking device 600 operates via a flexible cable 604 which, when the parking device is moved from the stowaway position A of FIG. 3 to the operating position B, operates on the hook 602 to allow coupling with the hook 601. This will accomplish, during the time the parking device reaches the operating position C, the wheels of the motor vehicle remain blocked and a small downward movement of the wheel 6 is needed to allow the rear or the front wheels to be raised from the ground. The means 604 can be made up of a steel braid with a flexible sheath.

Figure 10:
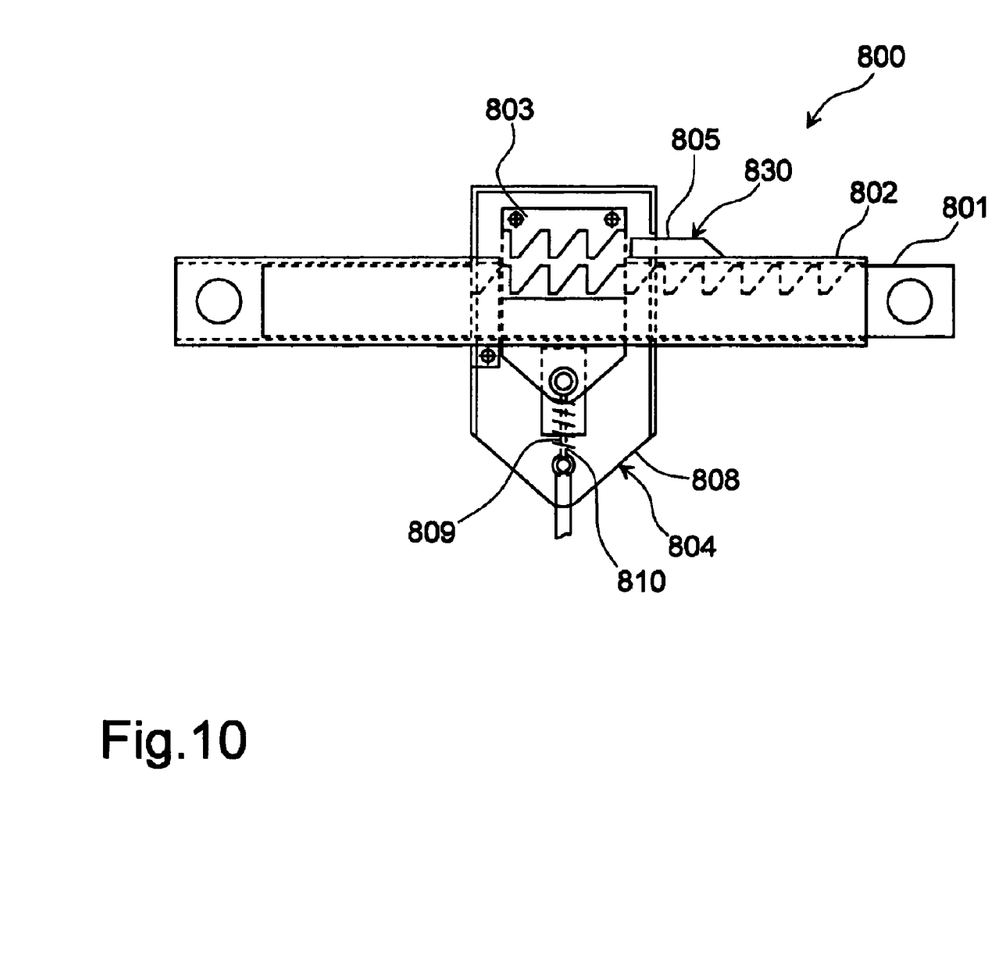
FIGS. 10 and 11 show a hooking device related to the parking device according to another variant of the embodiments of the invention.
Figure 11:
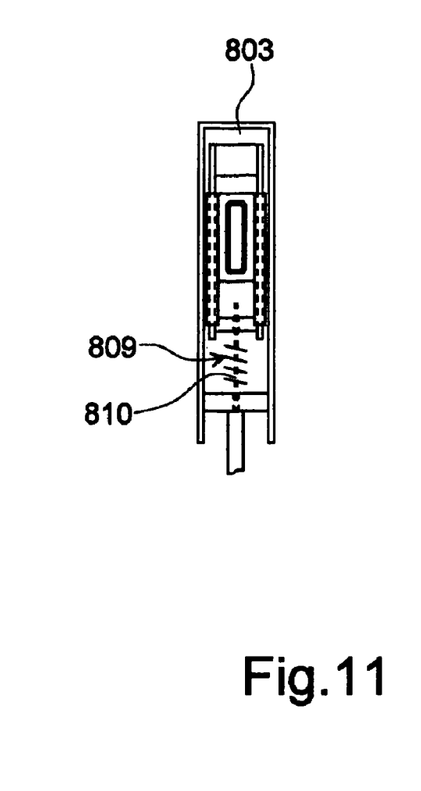

FIG. 10 and FIG. 11 show a hooking device 800 related to the parking device according to an additional embodiment of the present invention. The hooking device 800 comprises a rack 801 coupled to the axle shaft of the rear or front wheels of the motor vehicle and a guide 802 sliding on the rack and anchored to the bottom surface of the motor vehicle. A toothed part 803 is brought in a sliding way by guides 830 on the guide 802. The hooking device 800 comprises means 804 connected with the toothed part 803 which, when the parking device is activated, act on the same toothed part for allowing the coupling of the toothed part with the rack 801; in such a way, when the parking device reaches the operating position C of FIG. 3, the wheels of the motor vehicle remain blocked and a small movement downwards of the wheel is needed to allow the front or rear wheels to be lifted from the ground. The means 804 can be constituted by a lock 808 provided with a spring 809 and a flexible wire 810 allowing the compression of the spring 809; a traction of the wire 810 allows the compression of the spring 809 and the coupling of the toothed part 803 with the rack 801 while the release of the spring 809 allows the uncoupling of the toothed part 803 from the rack 801.

Figure 12:
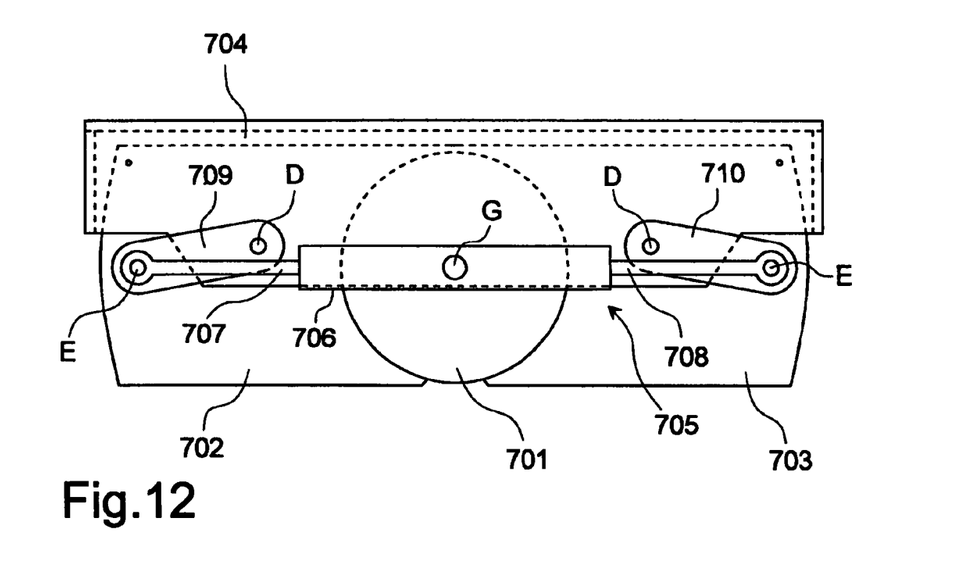
FIGS. 12 and 13 are front schematic views of a parking device according to a fourth embodiment of the invention.
Figure 13:
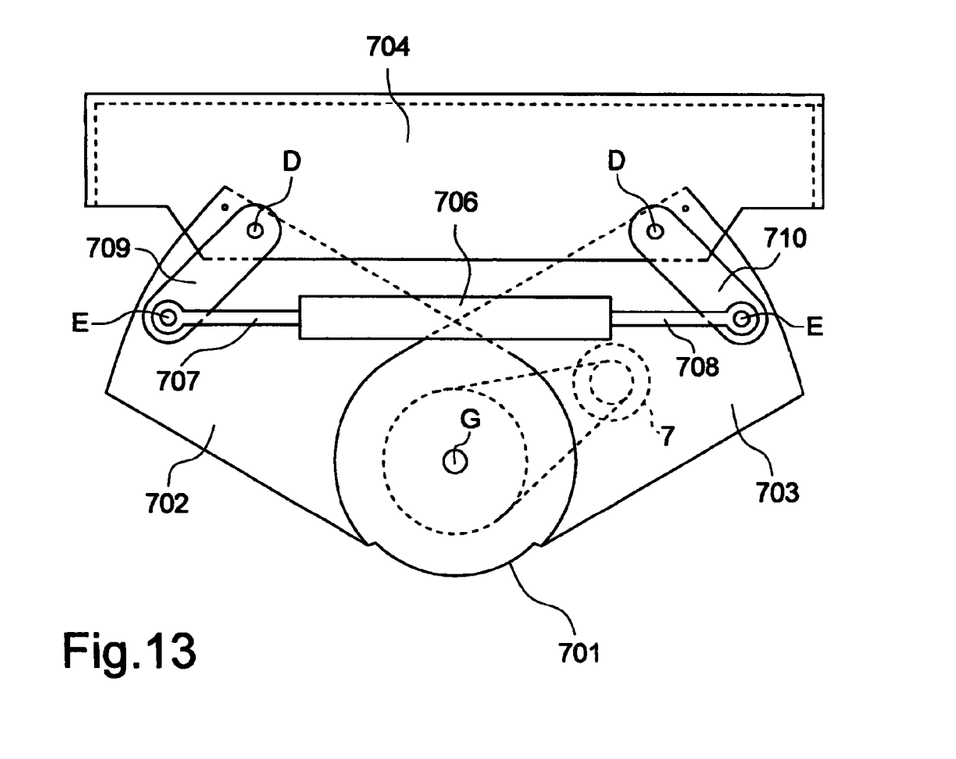

FIGS. 12 and 13 show a parking device for motor vehicles according to a fourth embodiment of the invention. The parking device comprises a wheel 701 pivoting around the axle G supported by two plates 702 and 703 which are swivelling coupled with a plate 704 attached to the bottom surface of the motor vehicle. The wheel 701 is positioned perpendicularly to the bottom surface of the motor vehicle and its rotation axis G is parallel to the bottom surface of the motor vehicle. The plates 702 and 703 and the wheel 701 are moved by piston assembly 705 allowing the movement of the wheel from the stowaway position A of FIG. 3, close to the bottom surface of the motor vehicle to a position B away from the bottom surface of the motor vehicle. The piston assembly 705 comprises, for example, an oleo-dynamic piston or a screw shaft 706 and comprises arms 707 and 708 connected to the plates 709 and 710 by the axles E. The plates 709 and 710 function like rocker levers, which are swivelling while hinged to the plates 702 and 703 at the points E and connected to the support 704 at hinged points D. The rocker levers 709, 710 allow the coupling of the plates 702 and 703 with the fixed plate 704.

The cylinder 706, by means of an electric control operated by a suitable switch, controls the pulling of the arms 707 and 708 bringing them next to each other and consequently reducing the distance between the two axles. This causes the rotation of the rocker levers 709 and 710 around the hinged points D and by consequence the pivoting of the plates 702 and 703 around the axle G producing a movement downwards of the cylinder 706. These movements cause the pivoting of the plates 702 and 703 around the shaft G and by consequence the lowering of the wheel 701 toward the ground, to reach the position B of FIG. 3 and obtaining a lifting of the rear part of the motor vehicle.

When the lifting of the motor vehicle is completed, an electric or oleo-dynamic or pneumatic motor 7, typically mounted to one of the plates 702 or 703, causes the rotation of the wheel 701 which moves the rear part of the motor vehicle in the desired direction to reach the parking position.

At the end of the parking operation of the motor vehicle, a suitable control allows to reverse the action of the arms 707 and 708 coupled to the cylinder 706 causing them to move away from one another. This action causes the distance between the two axles E to increase causing, the rotation of the rocker levers 709 and 710 around the hinged points D and by consequence causing the rotation of the plates 702, 703 around the axle G bringing back the wheel 701 from the operation position B of FIG. 3 to the stowaway position A.

Please note that FIG. 12 illustrates only one side of the components of the device which actually consists of two oleo-dynamic cylinders 706 and two pairs of rocker levers 709 and 710 hinged at four points D on both sides of the plates 702 and 703.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What I claim is:

1. A parking device to facilitate a parking operation of motor vehicles having a front part and a rear part both having at least one vehicle wheel, said parking device comprising:
   at least one wheel (701) mounted on a rotation axle;
   movement means (705) to move the at least one wheel (701) from a stowed position, in which the at least one wheel (701) is adjacent with a bottom of the motor vehicle, to an operating position in which the at least one wheel (701) is moved downwards and away from the bottom of the motor vehicle until at least one vehicle wheel of the rear part or front part of the motor vehicle lifts off the ground, said movement means (705) comprising at least a cylinder (706) having two arms (707, 708) partially sliding inside said cylinder (706), wherein said cylinder (706) and said arms (707, 708) extend horizontally and parallel to the bottom of the motor vehicle, and said at least one wheel (701) of the parking device having, at said operating position, a rotation axis parallel to the bottom of the motor vehicle;
   a motor (7) for rotating the at least one wheel (701) of the parking device; and
   a frame assembly supporting the at least one wheel (701) of the parking device, said frame assembly comprising a first plate (702) and a second plate (703) which are both pivotably coupled with the at least one wheel (701) via said rotation axle, pivotably coupled with said movement means (705) and pivotably coupled with a support plate (704) fixed to the bottom of the motor vehicle, wherein said movement means (705) is operable to cause rotation of the first and second plates (702, 703) about said rotation axle of the at least one wheel (701) and lower said at least one wheel (701) of the parking device until the at least one vehicle wheel of the rear part or front part of the motor vehicle lifts off the ground.

2. A parking device according to claim 1, wherein said motor (7) for rotating the at least one wheel (701) of the parking device is selected from one of the following groups consisting of hydraulic motors or electric motors.

3. A parking device according to claim 1, wherein said movement means (705) further comprises said arms (707, 708) of said cylinder (706) being pivotably coupled with the first and second plates (702, 703) of the frame assembly and pivotably coupled with two rocker levers (709, 710) pivotably coupled with the support plate (704) which is fixed to the bottom of the motor vehicle so that a pulling action of said cylinder (706) on said rocker levers (709, 710) causes lowering of the at least one wheel (701) of the parking device to the operating position, while a pushing action of said cylinder (706) on said rocker levers (709, 710) causes an elevation of the at least one wheel (701) of the parking device, thereby moving the at least one wheel (701) from the operating position to the stowed position.

4. A parking device according to claim 3, further comprising means to activate said cylinder (706).

5. A motor vehicle having a front part and a rear part, both having at least one vehicle wheel, comprising the parking device according to claim 1, said parking device being fitted on a bottom of the rear part of the motor vehicle.

* * * * *